(12) United States Patent
Nitschke et al.

(10) Patent No.: US 9,745,147 B2
(45) Date of Patent: Aug. 29, 2017

(54) GLASS SHEET FORMING SYSTEM

(71) Applicant: GLASSTECH, INC., Perrysburg, OH (US)

(72) Inventors: David B. Nitschke, Perrysburg, OH (US); Dean M. Nitschke, Maumee, OH (US); Michael J. Vild, Toledo, OH (US); David M. Luttrell, Grand Rapids, OH (US); Rusty J. Vannewhouse, Swanton, OH (US)

(73) Assignee: GLASSTECH, INC., Perrysburg, OH (US)

( * ) Notice: Subject to any disclaimer, the term of this patent is extended or adjusted under 35 U.S.C. 154(b) by 0 days.

(21) Appl. No.: 14/929,615

(22) Filed: Nov. 2, 2015

(65) Prior Publication Data
US 2017/0121128 A1 May 4, 2017

(51) Int. Cl.
| | |
|---|---|
| *C03B 35/14* | (2006.01) |
| *C03B 23/035* | (2006.01) |
| *C03B 23/02* | (2006.01) |
| *C03B 5/00* | (2006.01) |
| *B65G 49/06* | (2006.01) |
| *C03B 35/16* | (2006.01) |

(52) U.S. Cl.
CPC ............ *B65G 49/064* (2013.01); *C03B 35/16* (2013.01)

(58) Field of Classification Search
CPC ..... C03B 23/0235; C03B 23/035; C03B 5/00; C03B 2225/02; C03B 2225/00
USPC ................ 198/401, 395, 502.3, 464.1–464.4
See application file for complete search history.

(56) References Cited

U.S. PATENT DOCUMENTS

| | | |
|---|---|---|
| 3,806,312 A | 4/1974 | McMaster et al. |
| 3,880,635 A | 4/1975 | Jack et al. |
| 3,936,291 A | 2/1976 | McMaster et al. |
| 3,947,242 A | 3/1976 | McMaster et al. |
| 3,994,711 A | 11/1976 | McMaster |
| 4,204,854 A | 5/1980 | McMaster et al. |
| 4,222,763 A | 9/1980 | McMaster |
| 4,282,026 A | 8/1981 | McMaster et al. |
| 4,404,011 A | 9/1983 | McMaster |
| 4,421,225 A | 12/1983 | Hetman, Jr. |
| 4,437,871 A | 3/1984 | McMaster et al. |
| 4,470,838 A | 9/1984 | McMaster et al. |
| 4,512,460 A | 4/1985 | McMaster |
| 4,525,193 A | 6/1985 | McMaster et al. |

(Continued)

OTHER PUBLICATIONS

PCT International Search Report and Written Opinion Dated Jan. 27, 2016, Application No. PCT/US15/58548, Applicant Glasstech, Inc., 11 Pages.

*Primary Examiner* — Leslie A Nicholson, III
*Assistant Examiner* — Lester Rushin
(74) *Attorney, Agent, or Firm* — Brooks Kushman P.C.

(57) ABSTRACT

A system (10) for forming glass sheets includes a glass location sensing assembly (80) having a fluid switch (82) that is actuated by a roller conveyed glass sheet (G) to control operation of transfer apparatus (69) that transfers the glass sheet from the roller conveyor (22) to a forming mold (48) at a design position for forming. A frame of the sensing assembly (80) supports a carriage (124) on which the fluid switch (82) is mounted for lateral movement with respect to the direction of conveyance of the glass sheet (G) so as to sense its leading extremity. A lateral positioner (130) adjusts the lateral position of the carriage (124) and the fluid switch (82) mounted on the carriage.

9 Claims, 6 Drawing Sheets

(56) References Cited

U.S. PATENT DOCUMENTS

| | | | |
|---|---|---|---|
| 4,575,390 | A | 3/1986 | McMaster |
| 4,661,141 | A | 4/1987 | Nitschke et al. |
| 4,662,925 | A | 5/1987 | Thimons et al. |
| 4,872,898 | A | 10/1989 | Enk et al. |
| 4,872,989 | A | 10/1989 | Pirotta |
| 4,946,491 | A | 8/1990 | Barr |
| 4,951,808 | A * | 8/1990 | Collins ............... B65G 47/261 198/781.05 |
| 5,004,491 | A | 4/1991 | McMaster et al. |
| 5,226,942 | A | 7/1993 | Letemps et al. |
| 5,230,728 | A * | 7/1993 | McMaster ........... C03B 23/0302 65/171 |
| 5,330,550 | A | 7/1994 | Kuster et al. |
| 5,376,158 | A | 12/1994 | Shetterly et al. |
| 5,385,786 | A | 1/1995 | Shetterly et al. |
| 5,472,470 | A | 12/1995 | Kormanyos et al. |
| 5,900,034 | A | 5/1999 | Mumford et al. |
| 5,906,668 | A | 5/1999 | Mumford et al. |
| 5,917,107 | A | 6/1999 | Ducat et al. |
| 5,925,162 | A | 7/1999 | Nitschke et al. |
| 6,032,491 | A | 3/2000 | Nitschke et al. |
| 6,079,094 | A | 6/2000 | Ducat et al. |
| 6,173,587 | B1 | 1/2001 | Mumford et al. |
| 6,227,008 | B1 | 5/2001 | Shetterly et al. |
| 6,418,754 | B1 | 7/2002 | Nitschke et al. |
| 6,513,348 | B2 | 2/2003 | Shetterly et al. |
| 6,543,255 | B2 | 4/2003 | Bennett et al. |
| 6,578,383 | B2 | 6/2003 | Bennett et al. |
| 6,718,798 | B2 | 4/2004 | Nitschke et al. |
| 6,729,160 | B1 | 5/2004 | Nitschke et al. |
| 2014/0271058 | A1 | 9/2014 | Nitschke et al. |
| 2015/0218029 | A1 | 8/2015 | Nitschke et al. |

* cited by examiner

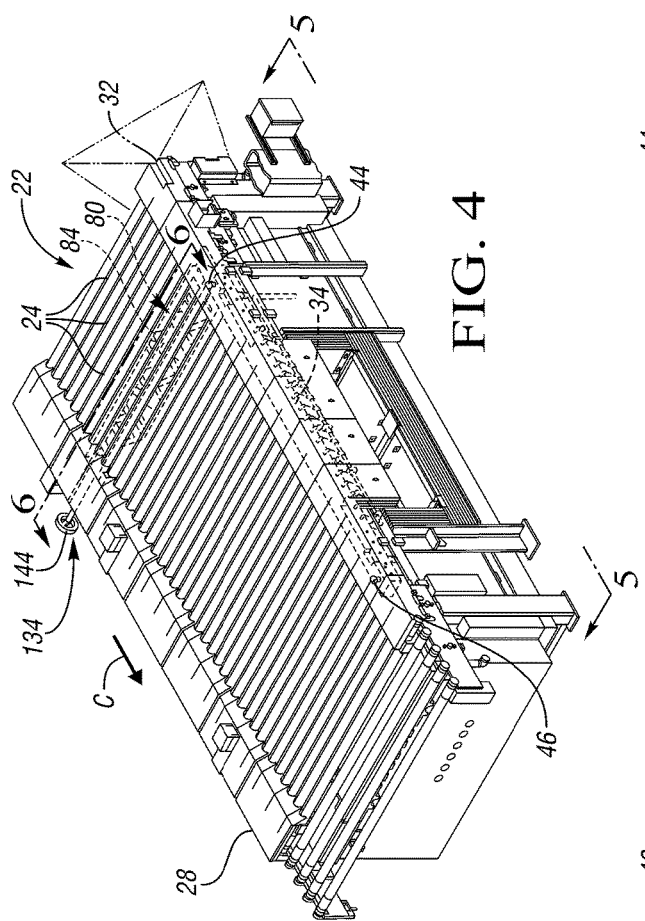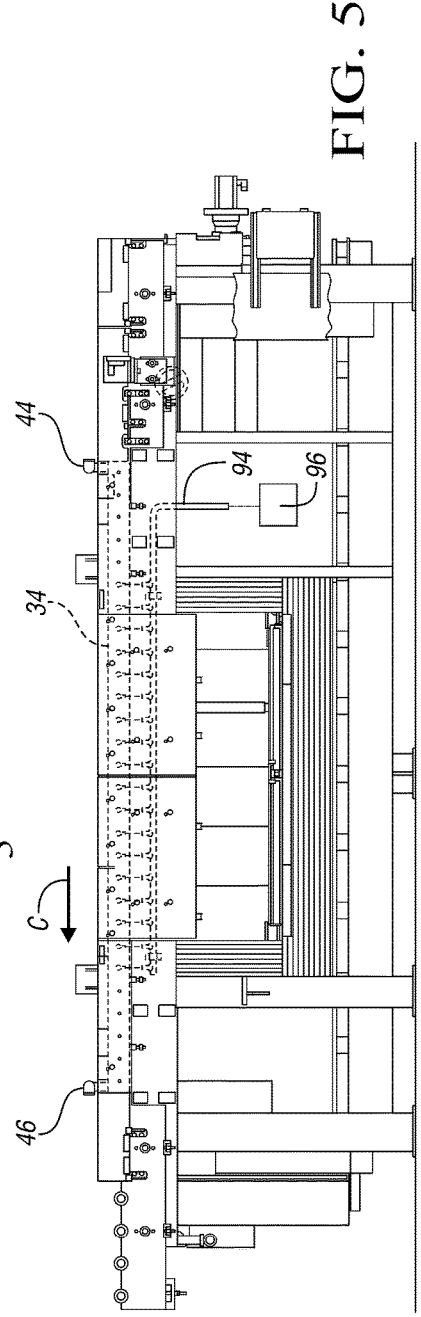

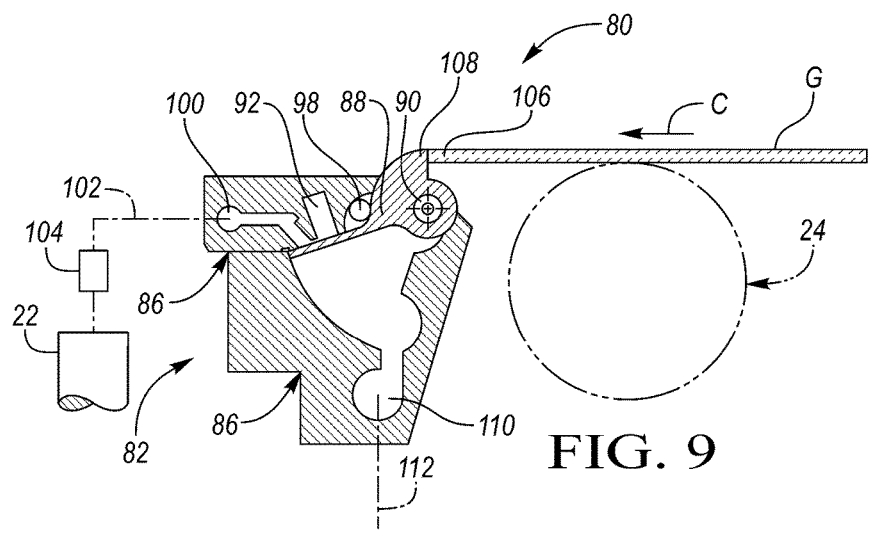
FIG. 9
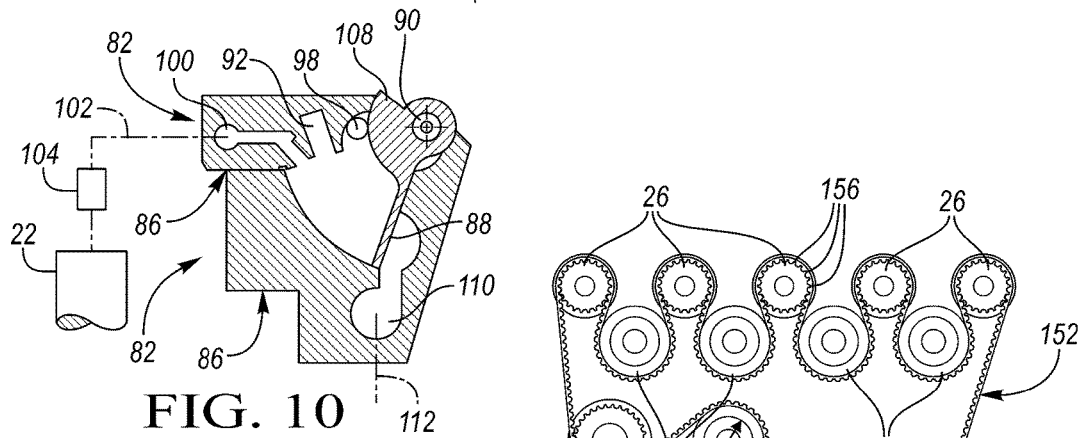
FIG. 10
FIG. 11
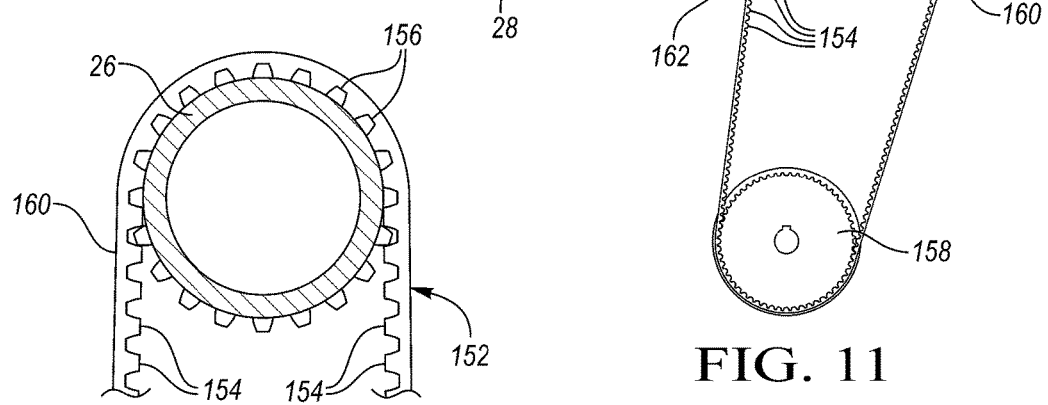
FIG. 12

GLASS SHEET FORMING SYSTEM

TECHNICAL FIELD

This invention relates to a glass sheet forming system for forming glass sheets.

BACKGROUND

Glass sheets are conventionally formed by heating on a conveyor within a furnace and then in one mode are formed within a heated chamber prior to delivery for cooling. Such cooling can be slow cooling to provide annealing or faster cooling that provides heat strengthening or tempering. In connection with heating of the glass sheets, see U.S. Pat. No. 3,806,312 McMaster et al.; U.S. Pat. No. 3,947,242 McMaster et al.; U.S. Pat. No. 3,994,711 McMaster; U.S. Pat. No. 4,404,011 McMaster; and U.S. Pat. No. 4,512,460 McMaster. In connection with glass sheet forming, see U.S. Pat. No. 4,204,854 McMaster et al.; U.S. Pat. No. 4,222,763 McMaster; U.S. Pat. No. 4,282,026 McMaster et al.; U.S. Pat. No. 4,437,871 McMaster et al.; U.S. Pat. No. 4,575,390 McMaster; U.S. Pat. No. 4,661,141 Nitschke et al.; U.S. Pat. No. 4,662,925 Thimons et al.; U.S. Pat. No. 5,004,491 McMaster et al.; U.S. Pat. No. 5,330,550 Kuster et al.; U.S. Pat. No. 5,376,158 Shetterly et al.; U.S. Pat. No. 5,472,470 Kormanyos et al.; U.S. Pat. No. 5,900,034 Mumford et al.; U.S. Pat. No. 5,906,668 Mumford et al.; U.S. Pat. No. 5,925,162 Nitschke et al.; U.S. Pat. No. 6,032,491 Nitschke et al.; U.S. Pat. No. 6,173,587 Mumford et al.; U.S. Pat. No. 6,227,008 Shetterly; U.S. Pat. No. 6,418,754 Nitschke et al.; U.S. Pat. No. 6,543,255 Bennett et al.; U.S. Pat. No. 6,578,383 Bennett et al.; U.S. Pat. No. 6,718,798 Nitschke et al.; U.S. Pat. No. 6,729,160 Nitschke et al. In connection with the cooling, see U.S. Pat. No. 3,936,291 McMaster; U.S. Pat. No. 4,470,838 McMaster et al.; U.S. Pat. No. 4,525,193 McMaster et al.; U.S. Pat. No. 4,946,491 Barr; U.S. Pat. No. 5,385,786 Shetterly et al.; U.S. Pat. No. 5,917,107 Ducat et al.; U.S. Pat. No. 6,079,094 Ducat et al.; and U.S. Pat. No. 6,513,348 Bennett et al.

One conventional way glass sheets are formed is by heating and conveyance on a conveyor into a heated forming station that has a forming mold located within the heated chamber above the conveyor. Conventionally, electrical limit switches that are mechanically actuated or electric eyes are utilized to initiate upward transfer of the heated glass sheet from the conveyor to a downwardly oriented curved forming face of the mold. The mechanical actuation of the electric limit switches thus must function effectively in the heated environment as must the electric eyes which have electromagnetic beams whose sensing signals the glass presence to initiate the upward transfer. However, the heat in the chamber can affect actuation of the electrical limit switches and their mechanical actuation and can also affect the electric eye beams. In prior commercial use that has not been available to the public, a fluid switch has previously been mounted in the heated interior of the system to sense the conveyed glass sheet location and actuate the forming cycle. This actuation previously has immediately actuated the cycle for glass sheet transfer from a roller conveyor to an upper mold, which necessitates the fluid switch being located adjacent the forming apparatus and not spaced therefrom so as not to interfere with the forming apparatus operation.

SUMMARY

An object of the present invention is to provide an improved glass sheet forming system.

In carrying out the above object, the glass sheet forming system of the invention includes a housing having a heated clamber and a roller conveyor including rollers for conveying a hot glass sheet within the heated chamber along a direction of conveyance in a horizontal plane in preparation for forming. A location sensing assembly of the system senses the location of the leading extremity of the glass sheet along the direction of conveyance and includes a frame supported by the housing to extend laterally with respect to the direction of conveyance in the heated chamber at a location below the horizontal plane along which the glass sheet is conveyed. A carriage of the location sensing assembly is mounted by the frame for lateral movement with the respect to the direction of conveyance, and a fluid switch is mounted by the carriage and is actuated by the conveyed glass sheet to provide a glass position sensing signal. A lateral positioner of the location sensing assembly has an inner connection to the carriage within the heated chamber and an outer operating portion located outside the housing for operation to move the carriage laterally with respect to the direction of conveyance to laterally align the fluid switch with the leading extremity of the conveyed glass sheet for the actuation that provides the glass position sensing signal for providing glass sheet positioning during the forming.

As disclosed, the lateral positioner includes a shaft having an inner end connected to the carriage and an outer end having a handle for moving the carriage and the fluid switch mounted thereon laterally with respect to the direction of conveyance into alignment with the leading extremity of the glass sheet. The inner end of the shaft has a lock for locking the carriage to prevent lateral movement thereof with respect to the direction of conveyance after the fluid switch is laterally aligned with the leading extremity of the glass sheet, and the handle on the outer end of the shaft operates the lock. More specifically, the lock includes an eccentric and the handle is rotated to rotate the shaft and thereby lock the eccentric against the frame to prevent the carriage from moving laterally with respect to the direction of conveyance.

As disclosed, the location sensing assembly includes a vertical adjuster for vertically adjusting the frame to vertically position the fluid switch with respect to the horizontal plane along which the glass sheet is conveyed. More specifically the vertical adjuster includes a wedge that vertically moves a lateral end of the frame to provide the vertical positioning of the fluid switch.

As disclosed, the fluid switch includes: a vacuum chamber in which a vacuum is drawn; a valve member having a closed position that closes an atmospheric port of the vacuum chamber and has an actuating portion that is contacted by the leading extremity of the conveyed glass sheet to move the valve member from the closed position to an open position with respect to the atmospheric port so air flows into the vacuum chamber to increase its pressure; a transducer that is located externally of the heated chamber and senses the pressure increase in the vacuum chamber to provide an electric glass position sensing signal for controlling the forming; and a pressure port to which pressurized air is supplied to move the valve member from the open position with respect to the atmospheric port to the closed position in preparation for another cycle of operation.

The objects, features and advantages of the present invention are readily apparent from the following detailed description of the preferred embodiment when taken in connection with the accompanying drawings.

BRIEF DESCRIPTION OF THE DRAWINGS

FIG. 4 is a perspective view illustrating a housing of the system with its upper portion removed to show a glass location sensing assembly including a frame that supports a fluid switch and is adjustable laterally with respect to the direction of conveyance to sense the leading extremity of the conveyed glass sheet to generate a control signal that subsequently actuates a forming cycle of the glass sheet.

FIG. 5 is an elevational view taken along the direction of line 5-5 in FIG. 4 to further illustrate the system.

FIG. 9 is an enlarged sectional view through the fluid switch taken in the opposite direction as FIG. 8 and shown as a conveyed glass sheet approaches the fluid switch to be sensed in preparation for the forming cycle.

FIG. 10 illustrates the fluid switch after having been actuated by the conveyed glass sheet.

FIG. 11 is an elevational view taken along the direction of FIG. 11-11 in FIG. 3 to illustrate a positive drive mechanism that drives a roller conveyor on which the glass sheets are heated and conveyed into the forming station.

FIG. 12 is an enlarged view of a portion of FIG. 11 shown as a toothed belt and a toothed gear that provide the positive driving of the roller conveyor.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
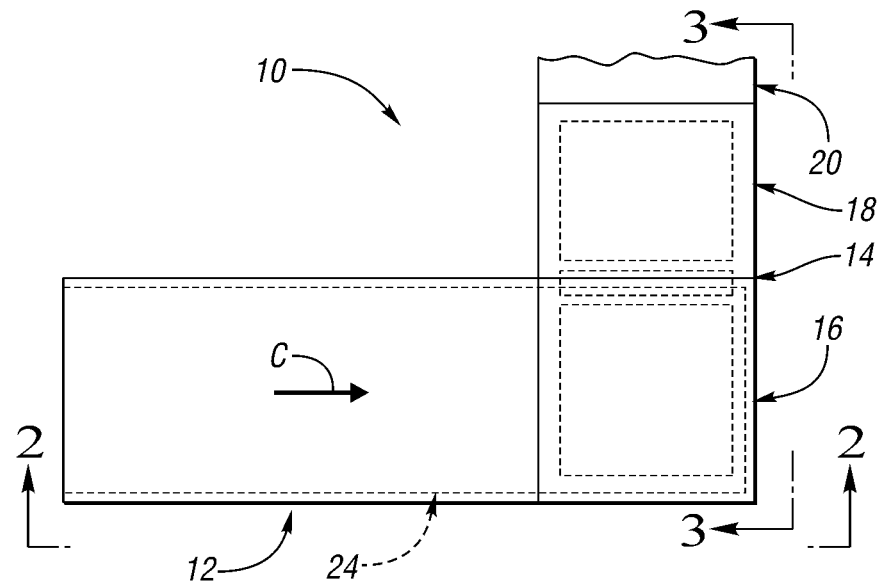
FIG. 1 is a schematic top plan view of a glass sheet forming system that embodies the present invention.
Figure 2:
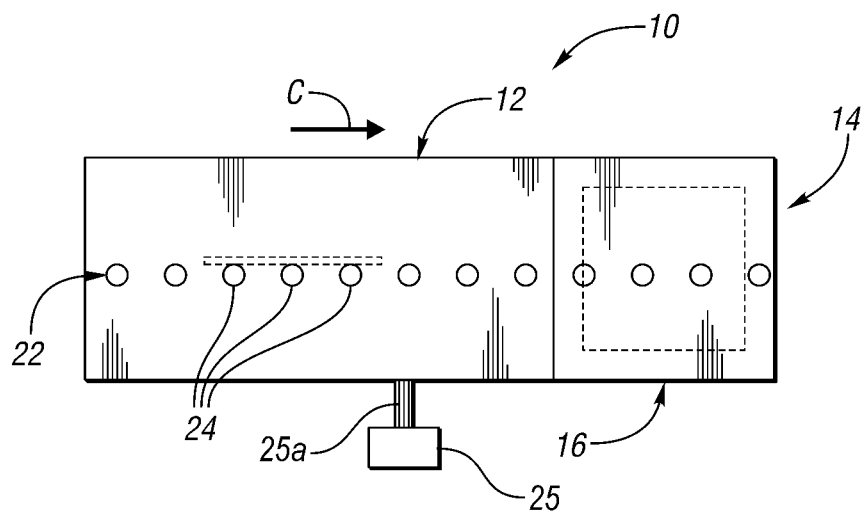
FIG. 2 is a schematic side elevational view of the forming system taken along the direction of line 2-2 in FIG. 1.
Figure 3:
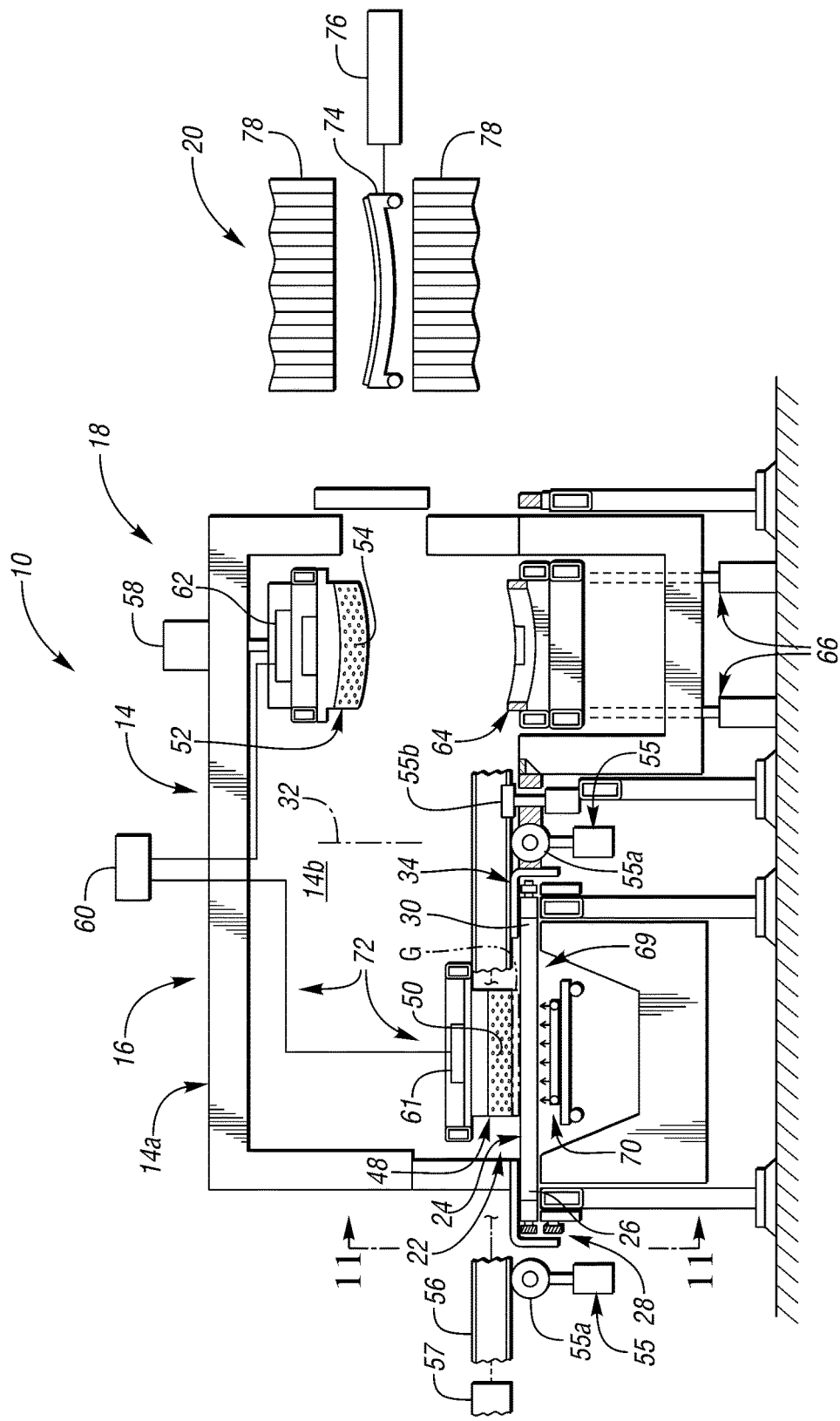
FIG. 3 is a schematic elevational end view of the forming system taken along the direction of line 3-3 in FIG. 1 and illustrates a forming station having first and second forming sections with forming molds utilized to provide glass sheet forming within the heated environment of the system.

With reference to FIGS. 1-3, a glass sheet forming system generally indicated by 10 embodies the present invention and includes a heating furnace 12, a forming station 14 including first and second forming locations 16 and 18, and a cooling station 20 for cooling a formed glass sheet G by slow cooling for annealing, faster cooling for heat strengthening or more rapid cooling for tempering. The furnace and forming station 14 collectively include a housing identified by 14a in FIGS. 3, 3A and 3B and defining a heated chamber 14b. Furthermore, the furnace 12 and the first forming section 16 of the forming station 14 include a roller conveyor 22 having conveyor rollers 24 for conveying a glass sheet G along a direction of conveyance C for heating. The rollers 24 are made of sintered bonded fused silica particles so as to have resistance to thermal warpage during heating and cooling and thus providing planarity of the glass sheet during the conveyance. All of the components of the forming system 10 are controlled by a controller 25 through a control bundle 25a of wires, optical fibers, tubes, etc. as schematically shown in FIG. 2.

As shown in FIG. 3, each roller 24 has one end 26 that can extend outwardly of the furnace to be rotatively driven by a schematically illustrated positive drive mechanism 28, that is one that does not solely depend on friction to provide the rotational roller driving, while another end 30 of each roller is located at a heated location adjacent the junction 32 between the first and second sections 16 and 18 of the forming station 14 and are received by a roller support structure 34 schematically illustrated in FIG. 3. More specifically, the support structure 34 as illustrated in FIGS. 4 and 5 has an elongated shape along the direction of conveyance C and includes an elongated cooling unit including a housing defining a cooling chamber that receives and has bearings that rotatably support the aligned set of roller ends 30. The cooling unit as shown in FIG. 5 includes an inlet 44 and an outlet 46 through which cooling fluid is supplied to the cooling chamber to provide cooling of the aligned set of roller ends 30 and cooling of the bearings during operation of the system.

In the specific forming system 10 as illustrated in FIG. 3, forming of the glass sheet is performed with the conveyor roll ends 30 cooled within the support structure 34. More specifically, this system has the forming station 14 with its first forming section 16 having a first upper mold 48 including a downwardly facing forming face 50 that is curved along the direction of conveyance C but has straight line elements transverse to the direction of conveyance, and the second forming section 18 has a second upper mold 52 that has a downwardly facing forming face 54 that is curved both along and transverse to the direction of conveyance C. Actuators 55 have rollers 55a that support beams 56 (only one shown) on which the first upper mold 48 is supported and moved vertically a slight extent by operation of the actuators 55 during the forming operation, and an actuator 57 moves the beams 56 and the first upper mold 48 on the beams horizontally between the first and second forming sections 16 and 18 of the forming station 14 during the forming operation. Lateral rollers 55b also contact the beams 56 to provide lateral positioning during movement of the first upper mold 38 between its pickup position in FIG. 3 and its delivery position in FIG. 3a.

Furthermore, an actuator 58 moves the second upper mold 52 vertically during the forming cycle of the forming station 14 and a source of pressurized air 60 supplies pressurized air to first and second gas pumps 61 and 62 to provide a vacuum and at other times pressurized air through arrays of holes in the forming faces 50 and 54 of the first and second upper molds 48 and 52 to initially support and subsequently release glass sheets G being formed. Also, a lower mold 64 in the second forming section 14 of the forming station is supported for vertical movement by jacks 66 during the forming. This vertical movement can be downward to allow the first upper mold 38 to move over the lower mold 64 and then upward so the release of the glass sheet is at a more closely spaced relationship to the lower mold to control positioning. In addition, the vertical movement of the lower mold 64 can also be used in cooperation with the vertical movement of the second upper mold 52 to perform press bending. Also, transfer apparatus 69 identified in FIG. 3 includes a pressurized air supply having a gas jet pump array 70 that provides lifting of a heated glass sheet G from the roller conveyor 22 to the first upper mold 48 and also includes a vacuum source 72 provided by the pressurized air supply and gas jet pump 61 that selectively provide the vacuum at the forming face 50 of upper mold 48 to commence the forming cycle as is hereinafter described.

In addition to the forming station 14, the system 10 as shown in FIG. 3 includes a cooling station 20 to which a formed glass sheet G is moved on a delivery mold 74 by an actuator 76 from the second forming section 18 to the cooling station between lower and upper quench heads 78 for cooling. As also previously mentioned, this cooling can be slow cooling for annealing, more rapid cooling for heat strengthening, or rapid cooling for tempering.

Figure 3A:
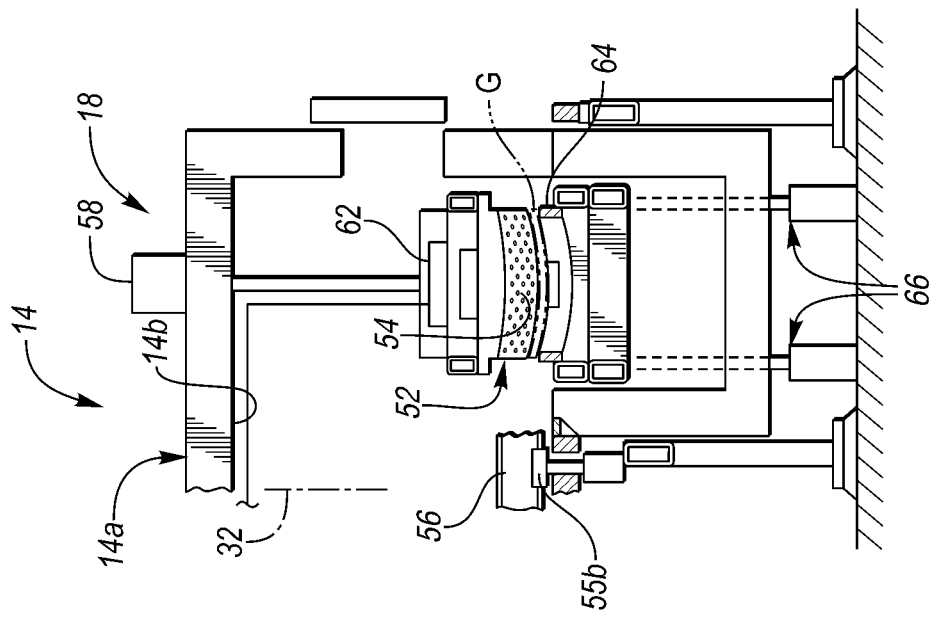
FIG. 3a is a partial elevation view showing the right second forming section of the forming station of FIG. 3 after an initially formed glass sheet has been moved thereto on a first upper mold from the left first forming station to a position above a lower mold and below a second upper mold that has released a formed glass sheet from a prior cycle onto a delivery mold that is subsequently moved out of the forming station for delivery.
Figure 3B:
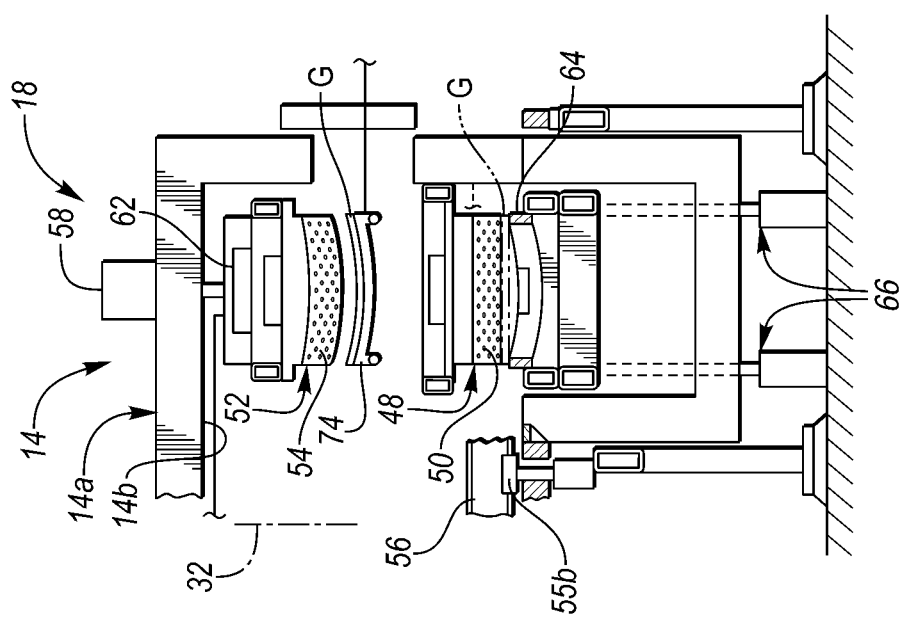
FIG. 3b is another partial view of the right second forming section of the forming station of FIG. 3 showing the glass sheet during press forming between the lower mold and the second upper mold.

The forming station 14 illustrated in FIGS. 3, 3a and 3b has three stages of operation wherein the glass sheet is formed on the first upper mold 48 with curvature in a first direction and straight line elements in a second direction transverse to the first direction, by gravity in transverse directions on the lower mold 64, which has an open center ring shape, after receipt thereby from the first upper mold 48 in its delivery position shown in FIG. 3a, and finally by the press forming between the second upper mold 52 and the lower mold 64 as shown in FIG. 3b.

A cycle of operation of the forming station 14 with reference to FIG. 3 begins by downward movement of the first upper mold 48 within the left first forming section 16 so that a glass sheet G can be lifted off of the roller conveyor 22 by vacuum applied to the face 50 of the first upper mold 48 and upward gas flow from the gas jet pump array 70. More specifically, the first upper mold 48 can be moved downwardly by actuators 55 to about one half inch (12 to 15 mm) from the conveyor 22 for the initial pickup of the glass sheet and can then be moved upwardly so the first upper mold can move above support structure 34. The actuator 57 then moves the beams 56 and the first upper mold 48 to the right into the second forming section 18 of the forming station to the location shown in FIG. 3a above the lower mold 64 and below the raised upper mold 52 that is shown above the delivery mold 74 that is then still operating in the prior cycle. The positioning of the first upper mold 48 and delivery mold 74 at different elevations within the second forming section 18 at the same time provides overlapping cycles that reduces the system cycle time and thus provides greater output that advantageously reduces the cost of the final formed glass sheet product.

After the lower mold 64 receives the glass sheet, the first upper mold 48 moves back to the first forming section 16 as shown in FIG. 3 in preparation for the next cycle and the glass sheet G is press formed between the second upper mold 52 and the lower mold 64 as shown in FIG. 3b. Subsequently the second upper mold 52 is moved upwardly to the position of FIG. 3a with the press formed glass sheet supported thereby and the delivery mold 74 is moved into the second forming section 14 as shown to receive the press formed glass sheet for subsequent movement to the quench 20 shown in FIG. 3.

It should be appreciated that the forming station 14 may have other constructions. For example, the forming station may alternatively have a first upper mold that only moves vertically and a lower mold that moves horizontally from below the first upper mold to below a second upper mold at an elevation below the elevation of a delivery mold that delivers the formed glass sheet after press forming between the lower mold and the second upper mold as disclosed by United States Patent Application Publication No. U.S. 2015/0218029 A1, the entire disclosure of which is hereby incorporated by reference.

As illustrated in FIGS. 4 and 6-8, the glass sheet forming system 10 includes a glass location sensing assembly 80 having a fluid switch 82 whose construction is more specifically illustrated in FIGS. 9 and 10. This fluid switch 82 is actuated by the conveyed glass sheet to provide a glass position control signal that in coordination with the conveyance of the glass sheet subsequently actuates the previously described transfer apparatus 69 to transfer the glass sheet from the roller conveyor 24 shown in FIG. 3 to the forming face 50 of the first upper mold 48. As shown in FIG. 4, the fluid switch 82 is located at an upstream location of the forming station 14 where the initial actuation by the conveyed glass sheet takes place upstream from the location at which the glass sheet is transferred to the first upper mold 48 shown in FIG. 3. The positive drive mechanism of the roller conveyor 22 and coordination of its rotational driving by the controller 25 insures that the transfer takes place at the proper location as is hereinafter more fully described. That transfer as was previously described is by the transfer apparatus 69 including the pressurized air supply having the gas jet pump array 70 and the vacuum source 72 that provides the vacuum at the forming face 50 for the forming.

Figure 6:
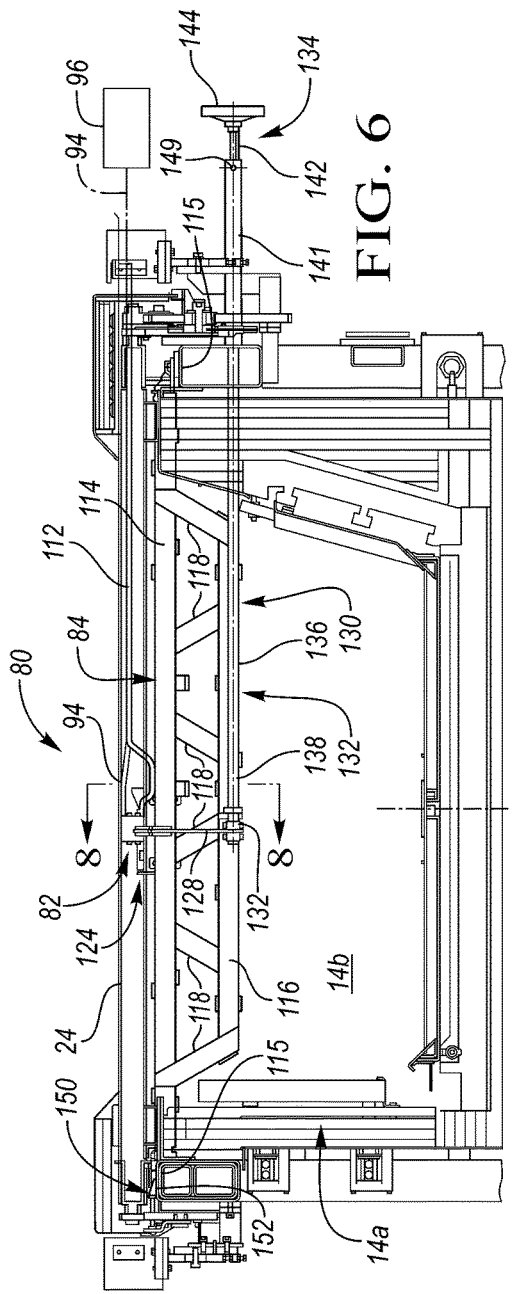
FIG. 6 is a sectional view taken along the direction of line 6-6 in FIG. 4 to further illustrate the construction of the location sensing assembly that supports the fluid switch for actuating the glass sheet forming cycle.
Figure 8:
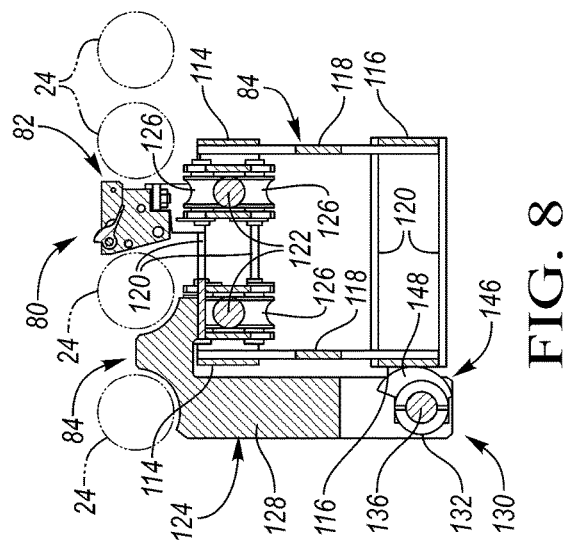
FIG. 8 is a sectional view taken generally along the direction of line 8-8 in FIG. 7 to show a carriage and a lock of a lateral positioner that selectively moves the carriage for lateral positioning of the fluid switch with respect to the direction of conveyance.
Figure 7:
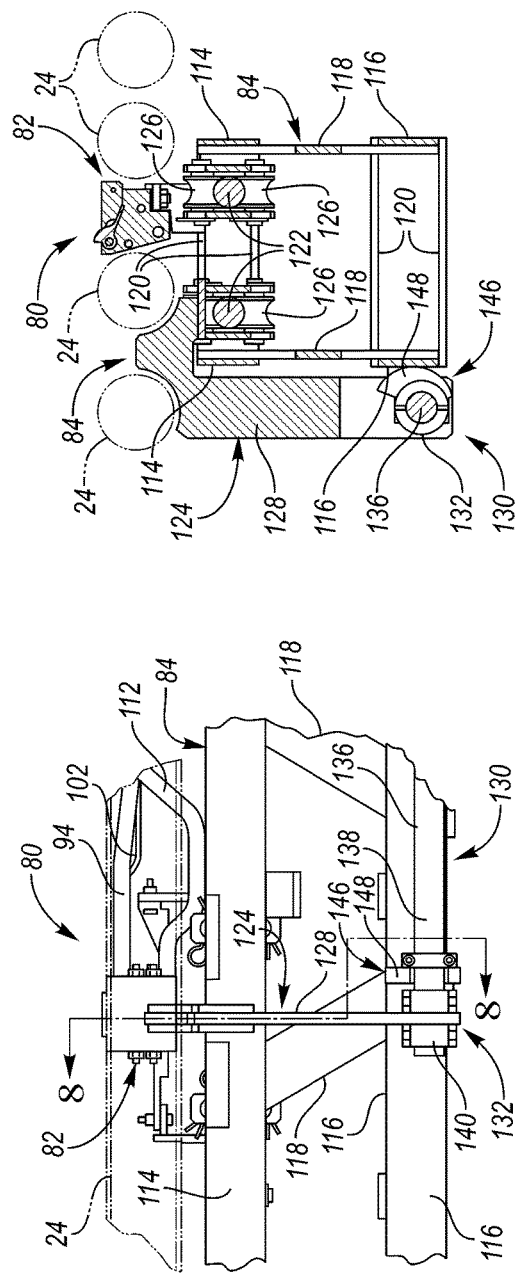
FIG. 7 is an enlarged view of a lateral central portion of the location sensing assembly of FIG. 6 where the fluid switch is located.

As is hereinafter more fully described, the location sensing assembly 80 includes a frame 84 mounted on the housing 14a within the heated chamber 14b, and the frame mounts the fluid switch 82 as shown in FIGS. 6-8. The structure of the frame and its mounting of the fluid switch 82 as well as the fluid switch operation will be hereinafter more fully described after an initial description of the fluid switch.

As illustrated in FIG. 9, the fluid switch 82 includes a housing collectively indicated by 86 and a valve member 88 mounted by a pivotal connection 90 on the housing and shown in a closed position. The housing 86 has a vacuum chamber 92 in which a vacuum is drawn through a vacuum conduit 94 shown in FIGS. 6 and 7 from a vacuum source 96 shown only in FIG. 6. This vacuum maintains the valve member 88 in its closed position by isolating the vacuum chamber 92 from an atmospheric port 98. Vacuum chamber 92 is communicated with a vacuum sensing port 100 which is communicated by a conduit 102 with a fluid transducer 104 that is located outside of the system heated chamber and that is operable to convert a fluid pressure change to an electrical control signal for communication to the system controller 25 shown in FIG. 2.

When a glass sheet G is conveyed as shown in FIG. 9 to the left along the direction of conveyance shown by arrow C, the leading edge extremity 106 of the glass sheet contacts an actuating portion 108 of the valve member 88 to initiate counterclockwise rotation about its pivotal connection 90 on the housing 86. The initial counterclockwise rotation of the valve member 88 begins communication of the atmospheric port 98 with the vacuum chamber 92 but there is then still a partial vacuum acting clockwise on the valve member 88 inhibiting its rotation toward the fully open position shown in FIG. 10. However, there is some momentum in the counterclockwise pivoting of valve member 88 due to the impact of the glass G and due to gravity acting on the greater mass of the valve member 88 to the left of the pivotal connection 90. Also, the continued conveyance of the glass to the left will continue to rotate valve member 88 to the fully open position of FIG. 10 as the vacuum port 100 increases in pressure and through the conduit 102 provides a fluid control signal to the transducer 104 which then generates an electrical control signal that is sent to the controller 25 (FIG. 2) which in coordination with the glass sheet conveyance subsequently initiates the upward glass sheet transfer operation previously described. The housing 86 of the fluid switch 82 as shown in FIG. 10 also includes a pressure port 110 which under the control of a valve operated by the controller 25 selectively provides pressurized air from a pressurized air source through a conduit 112 to the opposite side of the valve member 88 from the vacuum chamber 92. After the glass sheet is transferred upwardly from the conveyor, a burst of pressurized air fed to the port 110 pivots the valve member 88 clockwise from the open position of FIG. 10 back to the closed position of FIG. 9 in preparation for the next cycle.

With reference to FIGS. 6-8, the housing mounted frame 84 of the location sensing assembly 80 includes a pair of upper frame members 114 that extend laterally between opposite lateral sides 115 of the system housing 14a and are spaced from each other along the direction of conveyance as specifically illustrated in FIG. 8. Frame 84 also includes a pair of lower frame members 116 extending laterally with respect to each other and spaced along the direction of conveyance as also shown in FIG. 8 as well as being supported by lower ends of inclined supports 118 whose upper ends are supported by the upper frame members 114. Horizontal connection frame members 120 provide connection between the upstream and downstream frame members. A pair of support rods 122 (FIG. 8) of the frame extend laterally with respect to the direction of conveyance spaced along that direction as shown in FIG. 8.

A carriage 124 supports the fluid switch 82 as best shown in FIGS. 7 and 8 and has rollers 126 mounted by the support rods 122 for lateral movement with respect to the direction of conveyance. The carriage 124 includes a vertically extending carriage member 128 that extends over and down from the upstream upper frame member 114 to adjacent the upstream lower frame member 116.

As shown in FIG. 6, the location sensing assembly 80 includes a lateral positioner 130 having an inner connection 132 to the carriage 124 at the lower end of its vertical member 128 and has an outer operating portion 134 located outside of the system housing for operation to move the carriage laterally with respect to the direction of conveyance to laterally align the fluid switch 82 with the leading extremity of the conveyed glass sheet for the actuation that provides the glass position sensing signal for providing glass sheet positioning during the forming as previously described. The lateral positioner 130 includes a shaft 136 having an inner end 138 rotatably supported and axially located by a journal 140 that embodies the inner connection 132 and is mounted on the lower end of the vertically extending carriage member 128. The shaft 136 extends through a tube 141 mounted on one side wall 115 of the housing and has an outer end 142 including a handle 144 for moving the carriage 124 and the fluid switch 82 thereon laterally with respect to the direction of conveyance by push/pull movement into alignment with the leading extremity of the glass sheet.

The inner end 138 of the shaft 136 has a lock 146 (FIG. 7) including an eccentric 148 (FIG. 8) for locking the carriage 124 to prevent lateral movement with respect to the direction of conveyance after the fluid switch 82 is laterally aligned with the leading extremity of the glass sheet. The handle 144 is operable to rotate the shaft 138 to lock the eccentric 148 against the frame 84 at its adjacent lower frame member 116 to prevent carriage movement laterally with respect to the direction of conveyance. Rotation of the shaft counterclockwise as shown in FIG. 8 moves the eccentric 148 out of the contact with the adjacent lower frame member to prevent the lateral movement of the carriage for the adjustment. A screw 149 on the tube 140 is selectively operable to stop the shaft rotation to lock the carriage after its lateral positioning or to permit the shaft rotation to unlock the shaft to permit its lateral positioning.

As shown in FIG. 6, a vertical adjuster 150 includes a wedge 152 for vertically adjusting one lateral end of the frame 84 to vertically position the fluid switch 82 with respect to the horizontal plane along which the glass sheet is conveyed. This adjustment is only a relatively small amount to insure that the fluid switch is in an operable vertical position.

With reference to FIG. 11, the positive drive mechanism 28 of the roller conveyor 22 includes a continuous drive belt 152 having teeth 154 that mesh with teeth 156 with the roller ends 26 to provide positive driving that does not depend solely upon friction so that the actuation of the glass sheet transfer from the conveyor after a time interval of conveyance subsequent to the sensing of the glass position while still providing actuate location. In addition to meshing with the roller ends 26 and being tooth driven by a toothed input sprocket 158, the untoothed side 160 of the drive belt 152 winds around idler rollers 160 and an adjustable tensioning roller 162.

For a more specific disclosure of the roller support structure 34 and its cooling unit, see the U.S. patent application Ser. No. 14/929,763 filed on Nov. 2, 2015 and having the title GLASS SHEET PROCESSING SYSTEM HAVING COOLING OF CONVEYOR ROLLER ENDS, the entire disclosure of which is hereby incorporated by reference.

Likewise, for a more specific disclosure of the transfer apparatus 69, see the U.S. patent application Ser. No. 14/929,799 filed on Nov. 2, 2015 and having the title LIFT DEVICE FOR A GLASS PROCESSING SYSTEM, the entire disclosure of which is also hereby incorporated by reference.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. In glass sheet forming system including a housing having a heated clamber and a roller conveyor including rollers for conveying a hot glass sheet within the heated chamber along a direction of conveyance in a horizontal plane in preparation for forming, a location sensing assem- bly for sensing the location of the leading extremity of the glass sheet along the direction of conveyance, comprising:

a frame supported by the housing to extend laterally with respect to the direction of conveyance in the heated chamber at a location below the horizontal plane along which the glass sheet is conveyed;

a carriage mounted by the frame for lateral movement with the respect to the direction of conveyance;

a fluid switch that is mounted by the carriage and that is actuated by the conveyed glass sheet to provide a glass position sensing signal; and a lateral positioner having an inner connection to the carriage within the heated chamber and an outer operating portion located outside the housing for operation to move the carriage laterally with respect to the direction of conveyance to laterally align the fluid switch with the leading extremity of the conveyed glass sheet for the actuation that provides the glass position sensing signal for providing glass sheet positioning during the forming, and the lateral positioner including a shaft having an inner end connected to the carriage and an outer end having a handle for moving the carriage and the fluid switch mounted thereon laterally with respect to the direction of conveyance to provide the alignment of the fluid switch on the carriage with the leading extremity of the glass sheet.

2. A location sensing assembly as in claim 1 wherein the inner end of the shaft has a lock for locking the carriage to prevent lateral movement thereof with respect to the direction of conveyance after the fluid switch is laterally aligned with the leading extremity of the glass sheet, and the handle on the outer end of the shaft operating the lock.

3. A location sensing assembly as in claim 2 wherein the lock includes an eccentric and the handle is rotated to rotate the shaft and thereby lock the eccentric against the frame to prevent the carriage from moving laterally with respect to the direction of conveyance.

4. A location sensing assembly as in claim 3 which includes a vertical adjuster for vertically adjusting the frame to vertically position the fluid switch with respect to the horizontal plane along which the glass sheet is conveyed.

5. A location sensing assembly as in claim 4 wherein the vertical adjuster includes a wedge that vertically moves a lateral end of the frame to provide the vertical positioning of the fluid switch.

6. In glass sheet forming system including a housing having a heated chamber and a roller conveyor including rollers for conveying a hot glass sheet within the heated chamber along a direction of conveyance in a horizontal plane in preparation for forming, a location sensing assembly for sensing the location of the leading extremity of the glass sheet along the direction of conveyance, comprising:

a frame supported by the housing to extend laterally with respect to the direction of conveyance in the heated chamber at a location below the horizontal plane along which the glass sheet is conveyed;

a carriage mounted by the frame for lateral movement with the respect to the direction of conveyance;

a fluid switch that is mounted by the carriage and that is actuated by the conveyed glass sheets to provide a glass position sensing signal;

a lateral positioner having an inner connection to the carriage within the heated chamber and an outer operating portion located outside the housing for operation to move the carriage laterally with respect to the direction of conveyance to laterally align the fluid switch with the leading extremity of the conveyed glass sheet for the actuation that provides the glass position sensing signal for providing glass sheet positioning during the forming; and the fluid switch including a vacuum chamber in which a vacuum is drawn, the fluid switch further including a valve member having a closed position that closes an atmospheric port of the vacuum chamber, the valve member having an actuating portion that is contacted by the leading extremity of the conveyed glass sheet to move the valve member from the closed position to an open position with respect to the atmospheric port so air flows into the vacuum chamber to increase its pressure, and a transducer that is located externally of the heated chamber and senses the pressure increase in the vacuum chamber to provide an electric glass position sensing signal for controlling the forming.

7. A location sensing assembly as in claim 6 wherein the fluid switch further includes a pressure port to which pressurized air is supplied to move the valve member from the open position with respect to the atmospheric port to the closed position in preparation for another cycle of operation.

8. In glass sheet forming system including a housing having a heated clamber and a roller conveyor including rollers for conveying a hot glass sheet within the heated chamber along a direction of conveyance in a horizontal plane in preparation for forming, a location sensing assembly for sensing the location of the leading extremity of the glass sheet along the direction of conveyance, comprising:

a frame supported by the housing to extend laterally with respect to the direction of conveyance in the heated chamber at a location below the horizontal plane along which the glass sheet is conveyed;

a carriage mounted by the frame for lateral movement with the respect to the direction of conveyance;

a fluid switch that is mounted by the carriage and that is actuated by the conveyed glass sheet to provide a glass position sensing signal; and a lateral positioner having a shaft including an inner connection to the carriage within the heated chamber and an outer operating end located outside the housing and having a handle for moving the carriage laterally with respect to the direction of conveyance to laterally align the fluid switch with the leading extremity of the conveyed glass sheet for the actuation that provides the glass position sensing signal for providing glass sheet positioning during the forming, and the inner end of the shaft also having a lock for locking the carriage to prevent lateral movement thereof with respect to the direction of conveyance after the fluid switch is laterally aligned with the leading extremity of the glass sheet.

9. In glass sheet forming system including a housing having a heated clamber and a roller conveyor including rollers for conveying a hot glass sheet within the heated chamber along a direction of conveyance in a horizontal plane in preparation for forming, a location sensing assembly for sensing the location of the leading extremity of the glass sheet along the direction of conveyance, comprising:

a frame supported by the housing to extend laterally with respect to the direction of conveyance in the heated chamber at a location below the horizontal plane along which the glass sheet is conveyed;

a carriage mounted by the frame for lateral movement with the respect to the direction of conveyance;

a fluid switch that is mounted by the carriage and that is actuated by the conveyed glass sheet to provide a glass position sensing signal;

a lateral positioner having a shaft including an inner connection to the carriage within the heated chamber and an outer operating end located outside the housing and having a handle for moving the carriage laterally with respect to the direction of conveyance to laterally align the fluid switch with the leading extremity of the conveyed glass sheet for the actuation that provides the glass position sensing signal for providing glass sheet positioning during the forming, and the inner end of the shaft also having a lock including an eccentric for locking the carriage by handle rotation of the shaft to prevent lateral movement of the carriage and the fluid switch with respect to the direction of conveyance after the fluid switch is laterally aligned with the leading extremity of the glass sheet; and a wedge that vertically moves a lateral end of the frame to provide vertical positioning of the fluid switch.

* * * * *